United States Patent
Eberlein et al.

(10) Patent No.: US 11,870,651 B2
(45) Date of Patent: Jan. 9, 2024

(54) LANDSCAPE MODEL VERIFICATION SYSTEM

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 109 days.

(21) Appl. No.: 17/536,373

(22) Filed: Nov. 29, 2021

(65) Prior Publication Data

US 2023/0169528 A1    Jun. 1, 2023

(51) Int. Cl.
| | |
|---|---|
| H04L 41/0893 | (2022.01) |
| H04L 41/12 | (2022.01) |
| H04L 41/08 | (2022.01) |
| H04L 41/50 | (2022.01) |
| G06Q 10/067 | (2023.01) |
| G06Q 30/0204 | (2023.01) |

(52) U.S. Cl.
CPC .......... *H04L 41/0893* (2013.01); *H04L 41/08* (2013.01); *H04L 41/12* (2013.01); *H04L 41/5058* (2013.01); *G06Q 10/067* (2013.01); *G06Q 30/0205* (2013.01)

(58) Field of Classification Search
CPC .............. G06Q 30/0205; G06Q 10/067; H04L 41/5058; H04L 41/0893; H04L 41/08
USPC ....................................................... 705/7.34
See application file for complete search history.

(56) References Cited

U.S. PATENT DOCUMENTS

| | | |
|---|---|---|
| 10,791,076 B1 | 9/2020 | Parunashvili et al. |
| 2017/0250936 A1 | 8/2017 | Rosenberg et al. |
| 2020/0273314 A1* | 8/2020 | Bordeleau ............. H04W 40/36 |
| 2020/0275281 A1* | 8/2020 | Bordeleau ............. H04W 36/12 |
| 2021/0021533 A1* | 1/2021 | Guim Bernat ........ H04W 4/029 |
| 2021/0216444 A1* | 7/2021 | Gefen ................. G06F 11/3688 |
| 2021/0226847 A1* | 7/2021 | Jindal ................. H04L 61/5007 |
| 2021/0303798 A1 | 9/2021 | Duong et al. |
| 2021/0304074 A1 | 9/2021 | Zaremoodi et al. |
| 2021/0319360 A1 | 10/2021 | Vishnoi et al. |
| 2021/0328886 A1* | 10/2021 | Guim Bernat ...... H04L 41/5012 |

OTHER PUBLICATIONS

Muntoni, et al., Mining the Architecture of Microservice-Based Applications from their Kubernetes Deployment, In: Zirpins, C., et al. Advances in Service-Oriented and Cloud Computing, ESOCC 2020, Communications in Computer and Information Science (Mar. 14, 2021) (Year: 2021).*

Communication: "Extended European Search Report", dated May 4, 2023 (dated May 4, 2023), European Patent Office, for European Application No. 22204005.7-1216-1203, 12 pages.

* cited by examiner

*Primary Examiner* — Charles Guiliano
(74) *Attorney, Agent, or Firm* — Buckley, Maschoff & Talwalkar LLC

(57) ABSTRACT

Systems and methods include determination of a plurality of call map clusters, each call map cluster associated with a respective type of external call, two or more of a plurality of services, and a service call model modelling, for each of the two or more of the plurality of services, the issuance of outgoing service calls in response to received service calls. A bot is deployed proximate to each of the plurality of services, and each deployed bot is associated with a respective configuration to issue outgoing service calls in response to received service calls as modelled by the service call models for each of one or more services proximate to the deployed bot.

17 Claims, 15 Drawing Sheets

| # | Service | Dependency | Outbound call |
|---|---|---|---|
| 1 | A | Start +10 | $AB_1$ |
| 2 | A | $BA_1$ +10 | $AB_2$ |
| 3 | A | Start +20 | $AC_1$ |
| 4 | A | $BA_2$ +20 | End |
| 5 | A | $CA_1$ +10 | End |
| 6 | B | $AB_1$ +100 | $BA_1$ |
| 7 | B | $AB_2$ +10 | $BA_2$ |
| 8 | C | $AC_1$ +20 | $CD_1$ |
| 9 | C | $EC_1$ +20 | $CA_1$ |
| 10 | E | $CE_1$ +30 | $DC_1$ |

| Cluster-ID, frequency | C1, 1200/h | C2, 50/h | C3, 10/h | C4, 100/h | C5, 200/h |
|---|---|---|---|---|---|
| 1st inbound call | AB1<br>• Wait: 30ms<br>• Call: A<br>• Size: 190k | AB1<br>• Wait: 10ms<br>• Call: A<br>• Size: 190k | AB1<br>• Wait: 10ms<br>• Call: A<br>• Size: 190k | AB1<br>• Wait: 100ms<br>• Call: A<br>• Size: 900k | AB1<br>• Wait: 30ms<br>• Call: A<br>• Size: 190k |
| 2nd inbound call | AB2<br>• Wait: 35ms<br>• Call: A<br>• Size: 3k | | | AB2<br>• Wait: 10ms<br>• Call: A<br>• Size: 3k | AB2<br>• Wait: 35ms<br>• Call: A<br>• Size: 3k |
| Terminate process / initialize state engine | After 2nd call to A | After 1st call to A | After 1st call to A | After 2nd call to A | After 2nd call to A |

*FIG. 8*

| Cluster-ID, frequency | C1, 1200/h | C2, 50/h | C3, 10/h | C4, 100/h | C5, 200/h |
|---|---|---|---|---|---|
| 1st inbound call | AC1<br>• Wait: 20ms<br>• Call: D<br>• Size: 10k | AC1<br>• Wait: 20ms<br>• Call: D<br>• Size: 10k | AC1<br>• Wait: 20ms<br>• Call: A<br>• Size: 10k | AC1<br>• Wait: 20ms<br>• Call: E<br>• Size: 20k | AC1<br>• Wait: 100ms<br>• Call: A<br>• Size: 200k |
| 2nd inbound call | DC1<br>• Wait: 20ms<br>• Call: A<br>• Size: 900k | DC1<br>• Wait: 20ms<br>• Call: A<br>• Size: 900k | | EC1<br>• Wait: 20ms<br>• Call: A<br>• Size: 2M | |
| Terminate process / initialize state engine | After 1st call to A | After 1st call to A | After 1st call to A | After 1st call to A | After 1st call to A |

FIG. 9

| Cluster-ID, frequency | C1, 1200/h | C2, 50/h | C3, 10/h modified | C4, 100/h | C5, 200/h |
|---|---|---|---|---|---|
| 1st inbound call | AC1<br>• Wait: 20ms<br>• Call: D<br>• Size: 10k | AC1<br>• Wait: 20ms<br>• Call: D<br>• Size: 10k | AC1<br>• Wait: 20ms<br>• Call: N<br>• Size: actual<br>• Type: test-call | AC1<br>• Wait: 20ms<br>• Call: E<br>• Size: 20k | AC1<br>• Wait: 100ms<br>• Call: A<br>• Size: 200k |
| 2nd inbound call | DC1<br>• Wait: 20ms<br>• Call: A<br>• Size: 900k | DC1<br>• Wait: 20ms<br>• Call: A<br>• Size: 900k | NC1<br>• Wait: 20ms<br>• Call: A<br>• Size: actual | EC1<br>• Wait: 20ms<br>• Call: A<br>• Size: 2M | |
| Terminate process / initialize state engine | After 1st call to A | After 1st call to A | After 1st call to A | After 1st call to A | After 1st call to A |

*FIG. 12*

LANDSCAPE MODEL VERIFICATION SYSTEM

BACKGROUND

Modern organizations often utilize a system landscape consisting of computing services provided by a plurality of geographically-distant computing systems. For example, in order to achieve desired functionality, an organization may deploy services within on-premise data centers (which themselves may be located in disparate geographic locations) and within data centers provided by one or more infrastructure as-a-service (IaaS) providers. A system landscape may also include services provided by third parties such as payment services and logistics services, which are accessed using region-specific access points defined by the third parties. The distance of these data centers and access points from one another introduces communication latencies which affect overall system performance, i.e., end-user request response time.

An organization may wish to re-locate a service in order to save cost, increase performance, and/or satisfy an operational requirement. In order to optimize the decision to re-locate the service, it is necessary to determine the extent to which moving the service will impact overall system performance. Simply locating the services in a manner which results in a lowest total inter-service latency is not optimal, because some communication paths may be used more often than others, and some communication paths may impact overall performance more than others. Moreover, some services may not be movable because they are, for example, tied to on-premise facilities (e.g., factory, warehouse, customer datacenter) or provided by a third party.

In one common scenario, an organization may wish to move a service from an on-premise system to a cloud-based server. For example, if a service deployment is moved from a datacenter within a customer facility to an offsite IaaS provider connected via wide area network (WAN), the communication between this service deployment and a warehouse system also located at the customer facility will exhibit increased latency. Moreover, the traffic from the premise to the IaaS provide may exceed a network bandwidth which was previously required for this customer facility, requiring acquisition of a leased line which provides increased bandwidth. It is desirable to identify this potential requirement prior to migration of the service deployment. Additionally, inbound and outbound traffic to/from IaaS providers is charged at a higher rate than intra-IaaS traffic, and it is desirable to minimize these charges by considering not only traffic endpoints but also actual payload sizes.

GEO-IP routing or Content Delivery Network (CDN)-type systems may introduce additional complications in the evaluation of a proposed service deployment. In particular, when these systems are employed, the location to which a service call is routed depends on the location of the calling service.

Previously, evaluation of changes within a system landscape required creation and operation of a complete test landscape, including booking of IaaS resources, deploying of components, configuration of services, providing of test data, and application of a test workload. The performance of the test landscape would be measured and analyzed, the test landscape would be modified based on the analysis, and the process would repeat for any number of iterations until an acceptable system landscape was determined.

Since communication patterns within a system landscape are complex and difficult to assess and options for deployment are many-fold, it is difficult to design a landscape to achieve a particular performance level and even more difficult to understand the consequences of changing an already-deployed landscape. In a large landscape of services, theoretical planning of an optimal layout can be computationally overwhelming.

The introduction of new services into a new landscape presents an additional but related difficulty. If the new services communicate with existing services deployed in different locations, the locations in which the new services should be deployed to achieve low latency and low traffic costs must be determined with respect to the locations of the existing services. Such consideration is preferably based on data characterizing communication between all the services during deployment, which is not available since the new services have not yet been deployed.

Systems are desired for efficiently generating a model of a system landscape without requiring a parallel test landscape, for verifying the accuracy of the model, and for using the verified model to evaluate overall performance resulting from a change to the system landscape.

BRIEF DESCRIPTION OF THE DRAWINGS

FIG. 8 illustrates configuration information used by a service-specific bot to simulate behavior of a service in accordance with models of service calls according to some embodiments.

FIG. 9 illustrates configuration information used by a service-specific bot to simulate behavior of a service in accordance with models of service calls according to some embodiments.

FIG. 12 illustrates configuration information used by a service-specific bot to simulate behavior of a service in accordance with the FIG. 11 call map clusters according to some embodiments.

DETAILED DESCRIPTION

Figure 1:
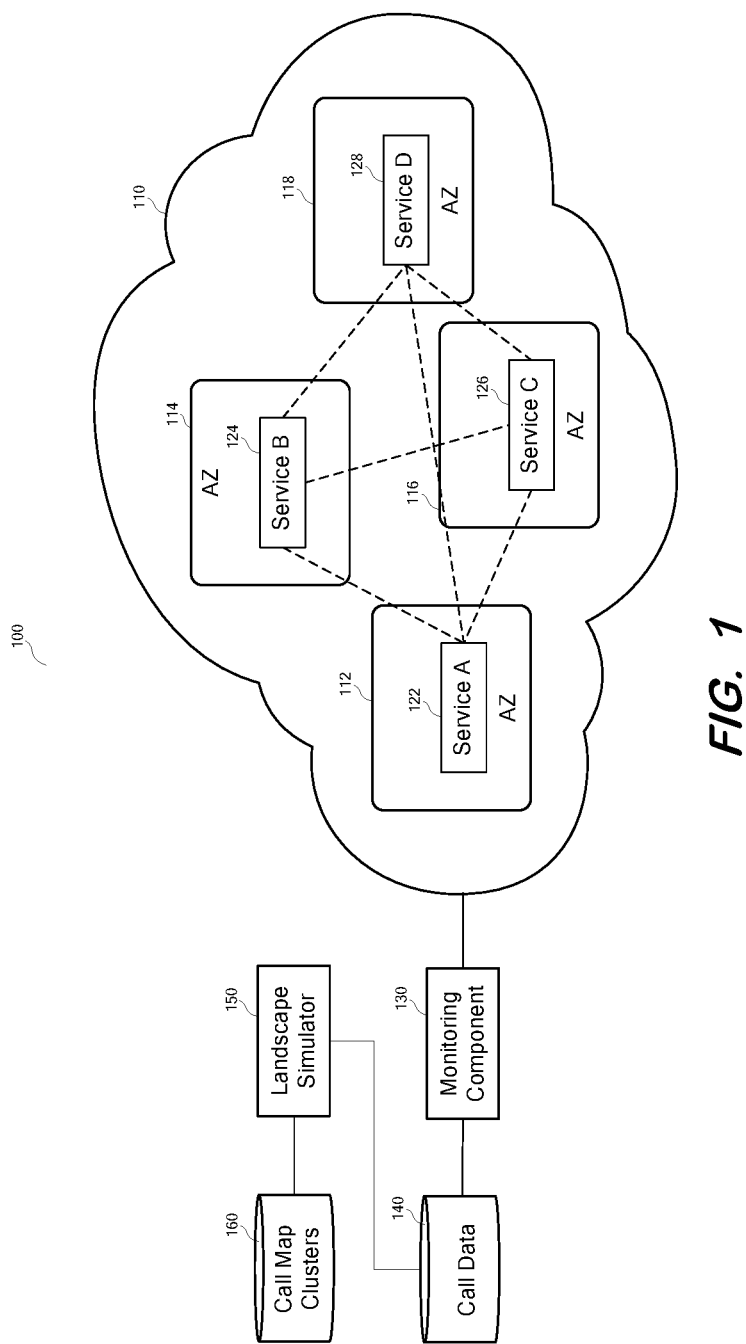
FIG. 1 is a block diagram of an architecture to generate models of service calls within a system landscape comprising a plurality of services according to some embodiments.

The following description is provided to enable any person in the art to make and use the described embodiments and sets forth the best mode contemplated for carrying out some embodiments. Various modifications, however, will be readily-apparent to those in the art.

Briefly, some embodiments utilize models of the service calls which are issued between services within a system landscape during productive operation. Such inter-dependent services within a system landscape will be referred to as a "service mesh". For each service within the service mesh, a corresponding "bot" is configured to mimic the communication characteristics of the service as defined by the models. The communication characteristics may specify a sequence in which to issue particular outgoing calls to other services in response to certain received service calls, a processing delay between call reception and an outgoing call, a payload size, etc. The network formed by the deployed service-mimicking bots may be referred to as a "bot mesh"

External calls are issued to the bot mesh in accordance with external call characteristics specified in the service call models. In response to each external call and based on its configuration, a bot issues one or more outgoing calls to other bots, which in turn issue one or more outgoing calls to other bots based on their respective configurations. Each bot may be deployed in the same data center as its corresponding service in order to experience the same network conditions (e.g., caching, routing, bandwidth) as experienced by the service during productive operation. System characteristics (e.g., end user response time, required network bandwidth across data centers, and IaaS costs) can be evaluated by monitoring the service calls between the bots.

According to some embodiments, a bot associated with a service may be moved to a proposed new location to simulate movement of the service to the new location. The system may then be operated as described above to issue external calls and corresponding configuration-driven bot-to-bot service calls within the bot mesh. These service calls may be monitored and used to evaluate changes to system cost and/or performance which would occur if the service were moved to the proposed location. Advantageously, this determination is accomplished without the need for deploying and configuring actual services and running a business load on the actual services to measure response time and network traffic.

Configuration of the bots can be extended in some embodiments to call existing third-party services (for which associated logs cannot be accessed) and/or services which are newly-integrated into the system landscape (and for which no call monitoring data is available).

Deployment and configuration of bots as described herein is more efficient than deployment and configuration of actual services. Moreover, bots consume only a fraction of the computing resources consumed by actual services. Monitoring of services calls between the bots and any third-party or newly-added services may also facilitate estimation of IaaS costs.

Embodiments may therefore allow developers to analyze different service deployments significantly faster at considerably lower costs and with substantially lower risk than existing systems which require iterative deployment and measurement of proposed changes to a system landscape.

FIG. 1 is a block diagram of an architecture of system 100 according to some embodiments. Each illustrated element of system 100 may be implemented using any suitable combination of computing hardware and/or software that is or becomes known. Such a combination may include implementations which apportion computing resources elastically according to demand, need, price, and/or any other metric. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service).

System landscape 110 may comprise any combination of computing systems interconnected in any known manner. The computing systems are associated with "availability zones" (AZs) 112-118, each of which is associated with a respective geographic region. One or more computing systems within each AZ provide respective services 122-128. For purposes of the description herein, the "location" of a service refers to the location of the computing system(s) which executes program code to provide such services. A computing system may comprise an on-premise server, a cloud-deployed virtual machine, or any other suitable computing system to provide a software-based service.

System landscape 110 is depicted within a cloud in order to represent communication between services 122-128 according to Web communication protocols, but embodiments are not limited thereto. Although each of services 122-128 is depicted as communicating with each other one of services 122-128, embodiments are not limited thereto.

Monitoring component 130 monitors service-to-service communications within the service mesh composed of services 122-128. For example, for each call made from one service to another, monitoring component 130 may acquire and store call data 140 describing the calling service, the called service, the payload size of the call, the time at which the call was made by the calling service (according to the clock of the calling service), the time at which the call was received by the called service (according to the clock of the called service), and a task identifier. Monitoring component 130 may comprise any system executing program code to provide the functions described herein. Monitoring component 130 may communicate with a control plane of the service mesh in order to acquire call data 140. In some embodiments, the control plane comprises sidecars of a service mesh as is known in the art.

A task identifier identifies all service-to-service calls which were made as a result of a single initial request (i.e., a single external call). The task identifier is also associated with a location from which the external call was transmitted. For example, an end-user may operate a Web browser to request an action from a first service. In order to fulfill the request, the first service may call a second service, receive a result from the second service, call a third service, and receive a result from the third service. The second service may call a fourth service and receive a result therefrom in order to respond to the call received from the first service. The first service then returns a result to the end user after inter-service calls have been completed. All of these inter-service calls are associated with the same unique task identifier.

The task identifier allows grouping of related calls and thereby facilitates modelling of the operation of the system landscape. For example, a task which updates contact information may involve a particular pattern of service-to-service calls, while a task which generates a purchase order may involve a different pattern of service-to-service calls. The task identifier allows identification of calls which were made to update contact information and identification of calls which were made to generate a purchase order, even if several of the same services were called during execution of each of these tasks. This task-specific identification allows modeling of the service-to-service communication within landscape 110 on a task-specific basis.

Landscape simulator 150 creates call map clusters 160 based on call data 140. A call map cluster may represent a particular pattern of service-to-service calls which results from a particular type of external call (e.g., update contact information). A call map cluster may be associated with two or more services which are called within the pattern, and a service call model which models the pattern. The service call model may specify the outgoing calls made by each of the two or more services within the pattern. For each specified outgoing call, the service call model may specify a service to which the outgoing call is directed, a preceding incoming call, a delay between the incoming call and the outgoing call, and payload characteristics (e.g., average size).

Each call map cluster may be associated with characteristics of the respective type of external call with which the cluster is associated. For example, the characteristics may indicate that the external call associated with a call map cluster is executed 50 times per hour on average, with 20 of those calls originating outside the cloud and 30 of those calls originating from an AZ within the cloud.

Call map clusters and service call models may be generated in some embodiments as described in commonly-assigned co-pending U.S. application Ser. No. 17/490,000, filed Sep. 30, 2021. For example, based on call data 140, landscape simulator 150 may identify sets of service calls which are each associated with a same task identifier. The sets may be grouped into clusters of sets which share similar characteristics (e.g., the same service-to-service-calls executed in the same order and with similar timings). Landscape simulator 150 may generate hypotheses for each cluster, evaluate the hypotheses by instructing monitoring component 130 to change particular service-to-service latencies within landscape 110 and to monitor resulting call data, and create call map clusters 160 based on the evaluation. Landscape simulator 150 may also comprise any system executing program code. In some embodiments, monitoring component 130 and landscape simulator 150 comprise the same or different applications executing on a same computing system.

Figure 2:
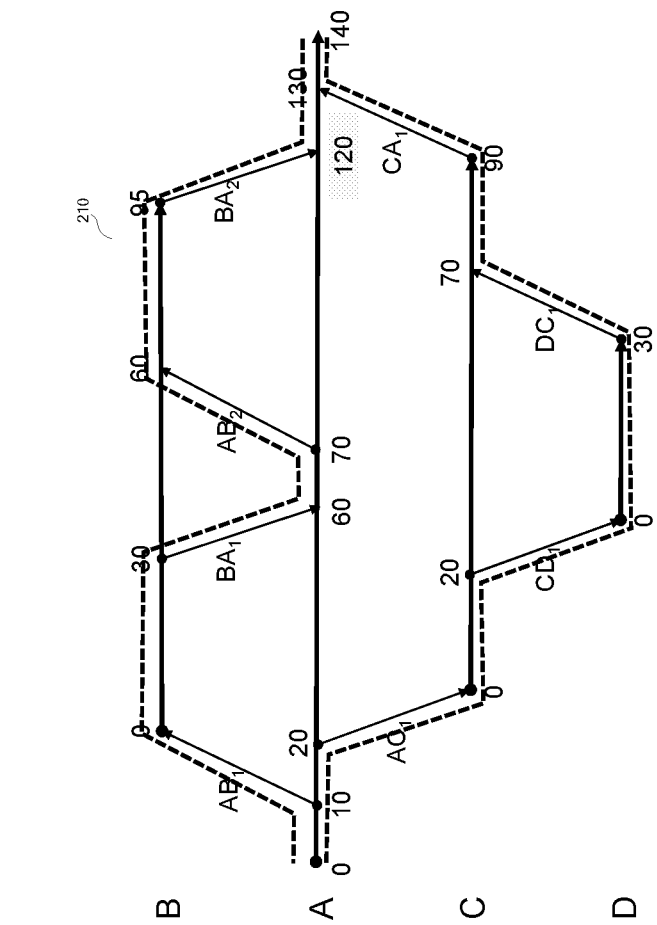
FIG. 2 illustrates a call map cluster and associated modeled dependencies according to some embodiments.

FIG. 2 is an example of call map cluster 210 and service call model 220 according to some embodiments. Call map cluster 210 illustrates service-to-service calls resulting from an initial external call of a particular type to service A. Service call model 220 represents incoming call to outgoing call dependencies for each service of call map cluster 210, which may have been determined by landscape simulator 150 as described above. These dependencies are represented by the dashed lines of call map cluster 210.

As shown in call map cluster 210 and model 220, service A calls service B (i.e., via service call $AB_1$) 10 ms after receiving the initial external call (i.e., "Start"). 30 ms after service B has been called via service call $AB_1$, service B calls service A (i.e., call $BA_1$). Similarly, service A calls service C (i.e., call $AC_1$) 20 ms after receiving the initial external call and service C calls service D (i.e., call $CD_1$) 20 ms after receiving call $AC_1$. Embodiments may include a plurality of other call map clusters and associated service call models, each of which corresponds to a particular type of external call.

Considering call map cluster 210, if the latency of communication between services A and B increases (e.g., because service B has been moved to a different region), the processing time required by service B for the particular task will likely not change. However, due to the increased latency, inbound call $BA_1$ will arrive at service A later than shown in diagram 210. If the "End" outbound call depends on $BA_1$ (i.e., if hypothesis $BA_1+80$ is valid), the response time for responding to the external call will therefore be impacted if service B is moved. If the "End" outbound call does not depend on $BA_1$ (i.e., if hypothesis $BA_1+80$ is invalid), moving service B will not impact response time.

Figure 3:
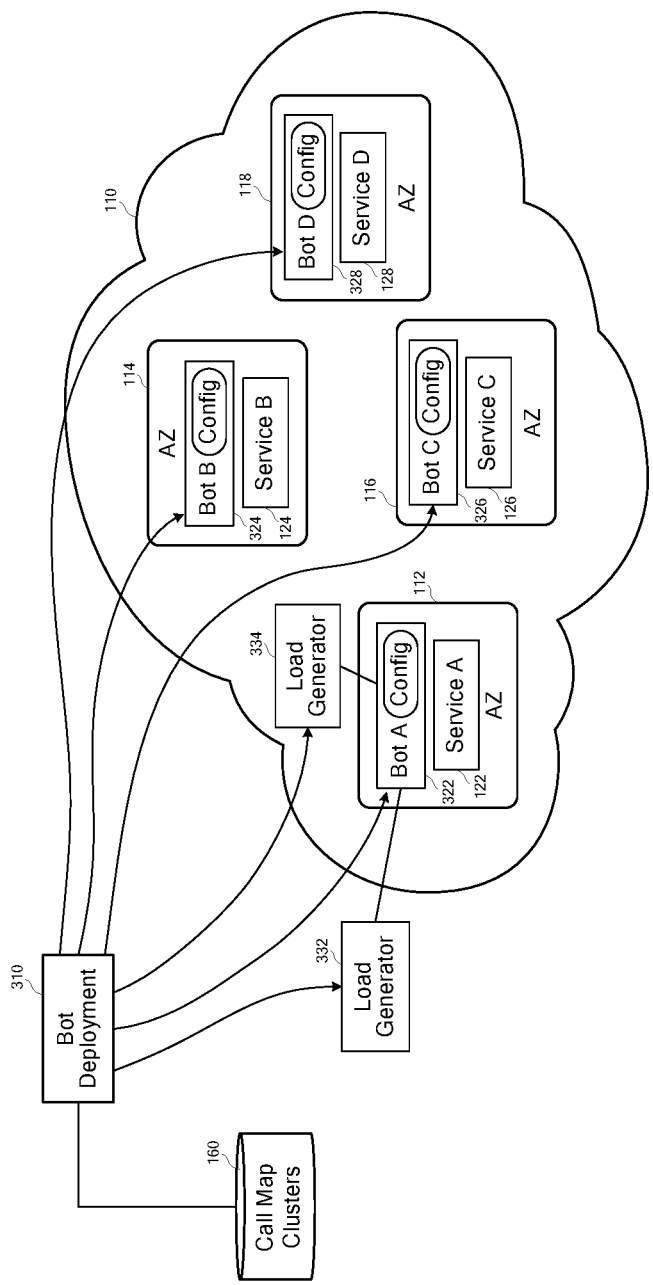
FIG. 3 is a block diagram illustrating deployment and configuration of service-specific bots to simulate modeled service calls within a system landscape according to some embodiments.

FIG. 3 is a block diagram illustrating deployment and configuration of service-specific bots to simulate modeled service calls within system landscape 110 according to some embodiments. Bot deployment component 310, which may comprise any system executing suitable program code, is shown deploying a bot 322-328 proximate to each service 122-128 within system landscape 110. For example, Bot A 322 may be deployed within a same data center as Service A 122 within AZ 112. Each bot, as will be described below, is intended to mimic the calling behavior of its associated service during generation of call data according to some embodiments. Collectively, bots 322-328 form a bot mesh.

In order to verify the accuracy of determined call map clusters and service call models, a bot of the bot mesh may be deployed on a same server or server rack as its associated service within the service mesh, or within a geographically-adjacent data center. The proximate location of each bot to its associated service is intended to ensure that latencies between the bots are similar to latencies between the associated services. Moreover, the proximate location ensures that calls to and from each bot are routed similarly as calls to and from its associated service in a case that system landscape employs GEO-IP routing and/or CDN-type systems.

Bot deployment component 310 also deploys a configuration for each deployed bot. The configuration for a given bot provides information which allows the bot to mimic the outbound calling behavior of its associated service. For example, a configuration includes at least one cluster id, which corresponds to a call map cluster and therefore to a particular type of external call associated with the call map cluster. For each cluster id, the configuration indicates that a new thread should be started for each received service call which is associated with a new task identifier and indicates when the thread should be terminated (e.g., by indicating a final outgoing call of the bot for the call map cluster).

The configuration also indicates how long to wait after each inbound call before sending an outbound call. For example, based on service call model 220 of FIG. 2, Bot B 324 associated with Service B 124 should wait 30 ms after receiving a first call ($AB_1$) from source Bot A 322 associated with Service A 122 before sending an outbound service call ($BA_1$) to target Bot A 322. The configuration further indicates that source Bot B 324 should send an outbound service call ($BA_2$) to target Bot A 322 35 ms after receiving a second call ($AB_2$) from Bot A 322. In order to facilitate the foregoing behavior in the case of a call map cluster including multiple incoming calls received from a same service, each bot tracks the number of inbound calls received from each service for each new task identifier.

The configuration includes information required to identify a bot associated with a given other service in the system landscape and to transmit a service call to the identified bot. In some embodiments, an outgoing service call defined in a configuration may be associated with a payload size distribution. Based on such a distribution, a bot may ensure that payload sizes of the outgoing service call for the particular call map cluster reflect the statistical distribution thereof within the previously-monitored service mesh.

In some embodiments, a single bot may be deployed proximate to two or more services in order to mimic the behavior of each of the two or more services. For example, AZ 112 may include a Service E in addition to Service A 122. Bot A 222 may therefore be associated with a configuration corresponding to Service A and a configuration corresponding to Service E, and operate to issue outgoing service calls to other bots according to each configuration in parallel.

Bot deployment component 310 may also deploy load generators 332 and 334 according to some embodiments. A load generator may be deployed for each external call origination location indicated by the call map clusters of system landscape 110, and each deployed load generator is configured to issue external calls to a service endpoint (e.g., Bot A 322). Moreover, each deployed load generator is configured to issue external calls of the types (i.e., having cluster ids) associated with its origination location and at specified call frequencies associated with each external call type. The associated call frequencies for each load generator may be specified by the call map cluster associated with each external call type.

Figure 4:
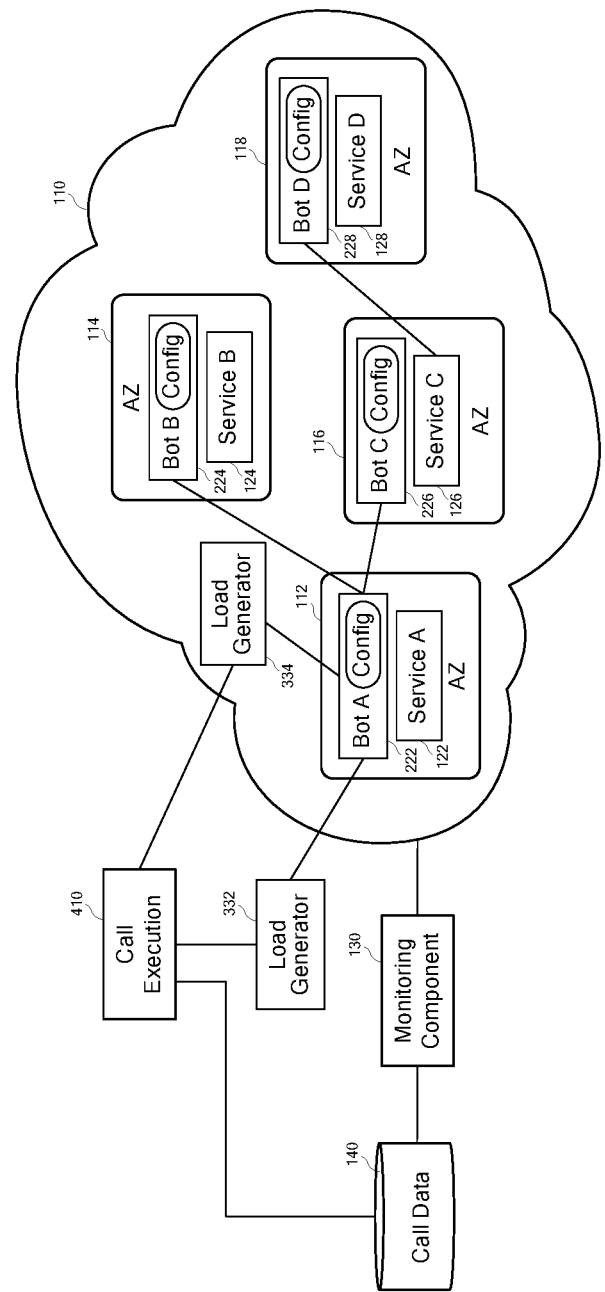
FIG. 4 is a block diagram illustrating the calling of service-specific bots based on modeled service calls according to some embodiments.

FIG. 4 illustrates operation of the deployed bots and load generators to generate call data according to some embodiments. As shown, call execution component 410 instructs load generators 332 and 334 to begin issuing external calls to Bot A 222 of the types and frequencies specified by the configuration of each load generator. Each issued external call includes a unique task identifier and a cluster id indicating the call map cluster with which the call is associated. The frequencies with which calls associated with a particular cluster id are issued may conform to the frequencies specified in the configuration of the load generator or may be changed to simulate high- or low-load phases.

In response to a received call, Bot A 222 determines whether any calls including this task identifier have been previously received. If not, Bot A 222 starts a new thread associated with the task identifier. If so, Bot A 222 determines how often the calling bot has called Bot A 222 with the task identifier. This information may be used to find configuration information of Bot A 222 which is associated with the cluster id of the external call, the bot from which the call was received, and the number of times a call including this task identifier has been received from the calling bot.

This configuration information indicates, as will be described in detail below, a next bot to call (if any), a time to wait before calling the next bot, and information for determining a payload size of the call to the next bot. The next bot is then called based on this information. If the configuration indicates that this call is a last call to be made by the bot for this cluster id, the bot terminates the thread associated with the current task identifier. The foregoing process may be performed by each deployed bot in response to a received call.

Monitoring component 130 may operate as described above to acquire call data 140 from the bot mesh during operation of the bots as described above with respect to call data of the service mesh. Each load generator may also store a start timestamp and corresponding task identifier upon issuing each external call, and store a response timestamp upon receiving a response associated with the task identifier. Each load generator may thereby determine a total response time for each external call issued thereby.

Figure 5:
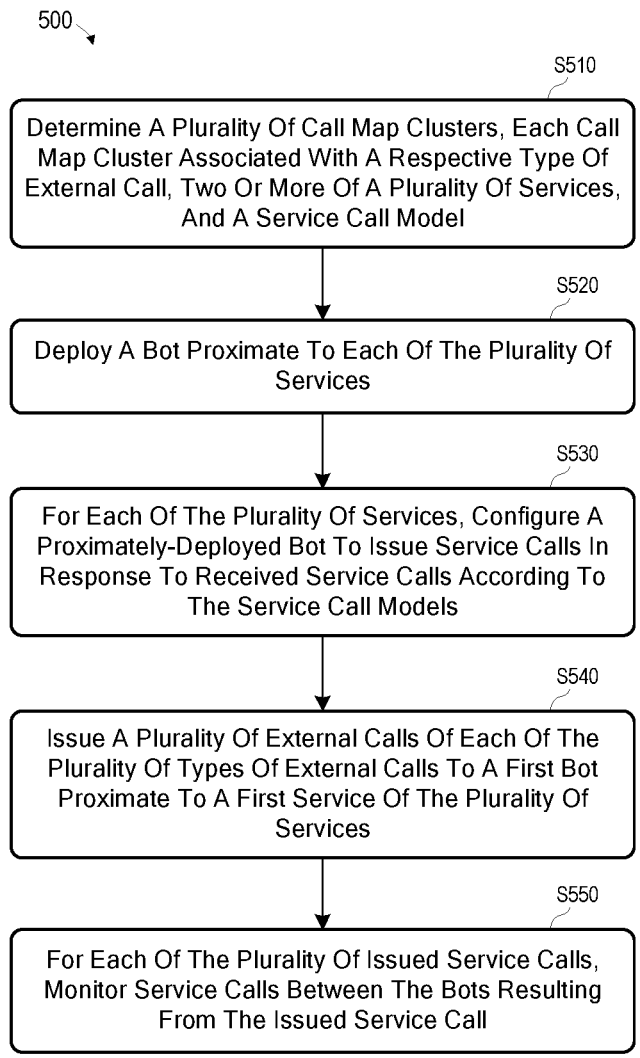
FIG. 5 comprises a flow diagram of a process to verify service call models of a system landscape according to some embodiments.

FIG. 5 comprises a flow diagram of process 500 to verify service call models of a service mesh according to some embodiments. Process 500 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a plurality of call map clusters are determined at S510. As described above, each call map cluster may represent a pattern of service-to-service calls which results from a type of external call, and is associated with a service call model specifying the outgoing calls made by each of two or more services within the pattern. The service call model may specify, for each of these outgoing calls, a preceding incoming call, a delay between the incoming call and the outgoing call, a service to which the outgoing call is to be directed, and information specifying the size of the payload of the outgoing call.

Figure 6:
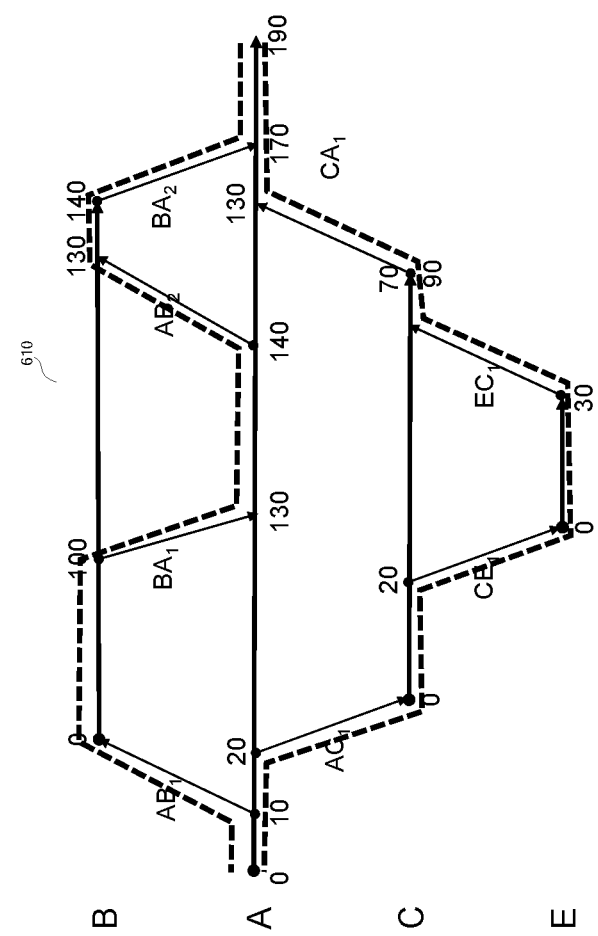
FIG. 6 illustrates a call map cluster and associated modeled dependencies according to some embodiments.

FIG. 6 is an example of call map cluster 610 and service call model 620 according to some embodiments. It may be assumed that call map cluster 610 and call map cluster 210 of FIG. 2 are determined at S510. Call map cluster 610 illustrates service-to-service calls resulting from an initial external call of a particular type to service A. The type of the initial external call is different from the type of initial external call associated with call map cluster 210.

Service call model 620 represents incoming call to outgoing call dependencies for each service of call map cluster 610. As shown by the dashed lines of call map cluster 610 and model 620, service A calls service B (i.e., via service call $AB_1$) 10 ms after receiving the initial external call (i.e., "Start"). Service B then calls service A (i.e., call $BA_1$) 100 ms after service B was called via service call $AB_1$. Similarly, service A calls service C (i.e., call $AC_1$) 20 ms after receiving the initial external call and service C calls service E (i.e., call $CE_1$) 20 ms after receiving call $AC_1$.

S510 may include determination of other call map clusters and associated service call models, each of which corresponds to a particular type of external call. S510 may further include determination of information indicating the frequency with which each type of external call is received by the service mesh. This information may further specify the frequency with which each type of external call is received from each of a plurality of locations by the service mesh.

Figure 7:
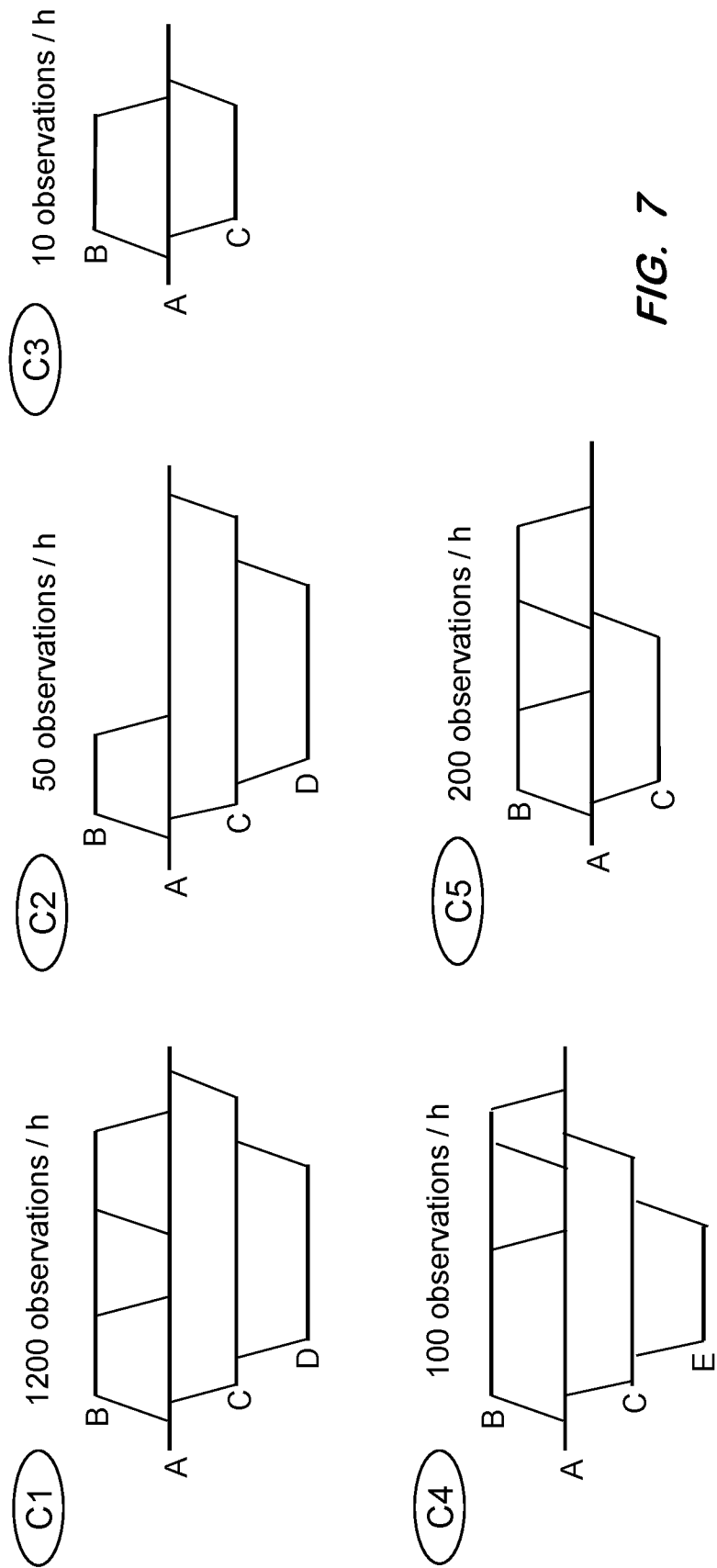
FIG. 7 illustrates call map clusters associated with a system landscape according to some embodiments.

FIG. 7 illustrates call map clusters C1 through C5, each of which may be determined at S510 and is associated with a respective type of external call (e.g., calls C1 through C5). Each call map cluster C1 through C5 includes calls between two or more services, and the patterns of the calls differ for each call map cluster. Each call map cluster is also associated with a call frequency (i.e., observations per hour) indicating a frequency with which its respective external call was observed.

Next, at S520, a bot is deployed proximate to each of the plurality of services associated with the call map clusters. As described above, Bot A 322 may be deployed at S520 within a same data center as Service A 122 within AZ 112. The proximate location of each bot to its associated service is intended to ensure that latencies between the deployed bots are similar to latencies between the associated services and that calls to and from each bot are routed similarly as calls to and from its associated service. In some embodiments, a single bot may be deployed proximate to two or more services in order to mimic the calling behavior of each of the two or more services.

For each of the plurality of services, a proximately-deployed bot is configured at S530 to issue service calls in response to received service calls according to the service call models. The configuration for a given bot provides information which allows the bot to mimic the outbound calling behavior of its associated service.

FIG. 8 depicts a configuration associated with Service B of the call map clusters of FIG. 7, and FIG. 9 depicts a configuration associated with Service C of the call map clusters of FIG. 7. As shown, for each call map cluster C1-C5, the configuration includes a dedicated portion specifying one or more inbound calls and their relative order. For each inbound call, the configuration specifies an outbound call, a time to wait between receipt of the inbound call and sending of the outbound call, and a payload size of the outbound call. In some embodiments, a payload size may be configured as a statistical distribution (e.g., 10% 3 k, 40% 10 k, 50% 90 K).

Accordingly, upon receipt of an inbound call, a deployed bot configured as shown in FIG. 8 or 9 identifies the cluster id of the inbound call to determine a column of the configuration and identifies the task identifier and sending service of the inbound call to determine a row of the configuration. The bot uses the information within the cell located at the determined column and row to issue a next call. The configuration information of FIGS. 8 and 9 also indicates, for each cluster id, when the corresponding bot should terminate a task identifier-specific thread.

S540 includes issuing of a plurality of external calls of each of the plurality of types to a first bot of the deployed bots which is associated with a first service. In one example, execution component 410 instructs load generators 332 and 334 to begin issuing external calls to Bot A 222 of the types and type-specific frequencies specified by the configuration of each load generator. Each issued external call includes a unique task identifier and a cluster id indicating the call map cluster with which the call is associated. Accordingly, the frequencies with which calls associated with a particular cluster id are issued may conform to the frequencies specified in the configuration of the load generator.

In response to a received call, the first bot operates according to its configuration and the cluster id and task identifier of the received call as described herein. This operation may result in issuing of calls to other deployed bots, which also operate in accordance with their respective configurations, the cluster id and the task identifier. At S550, the service calls within the deployed bot mesh resulting from each issued external call are monitored. Each monitored service call is associated with a cluster id and a task identifier, which allows generation of call maps and also of call map clusters based on the call maps. The task identifiers of the monitored service calls may be used to identify a corresponding overall response time which may be determined for each task identifier by the load generators. The call map clusters and response times may be used to verify the call map clusters determined at S510 and/or to identify issues within the system landscape.

As mentioned above, the effect of proposed changes to the service mesh may be efficiently simulated using the bot mesh. For example, it may be desired to move Service C 126 from AZ 116 to AZ 114. In order to simulate this move, Bot B 224 (or another deployed bot) within AZ 114 may be configured to mimic the behavior of Service C 126 as described herein. Each other bot in the bot mesh is also configured to associate Bot B 224 with Service C 126, so that outgoing calls to "Service C" within the bot mesh arrive properly at Bot B 224. Such movement may simulate latencies between corresponding services of a proposed service mesh and routing characteristics which may change due to the proposed movement. S540 and S550 are then executed to issue external calls to the newly-modified bot mesh and to monitor the resulting service calls within the bot mesh. The monitored service calls may be used to construct call map clusters and service call models and to evaluate performance characteristics and resource needs of the, Moreover, the resources of the changed bot mesh may be provided under a cloud (i.e., hyperscaler) account that is different from the account under which the service mesh operates. As a result, deployment costs of the proposed service mesh may be estimated by executing S540 over a period of time and simply obtaining the corresponding charges for that period of time from the cloud provider.

In some embodiments, many different changes to the service mesh may be evaluated as described above, and one of the changes may be adopted for actual deployment according to the evaluations.

Proposed changes to a service mesh may also or alternatively include addition of a new service. Embodiments may provide insights into the communication characteristics and the impact on end-user response time which would result from addition of the new service, without requiring a deployment of the new service into the service-to-service communications of system landscape 110.

Since the new service has not yet been deployed in the system landscape, no call map clusters are available which represent the new service within the service mesh. Embodiments may therefore deploy the new service for interaction with a bot mesh configured as described above. External calls may then be issued to the bot mesh and resulting service calls monitored as described above to generate call map clusters and associated service call models. These call map clusters and service call models thereby approximate productive operation of the service mesh in a case that the new service is deployed therein.

Figure 10:
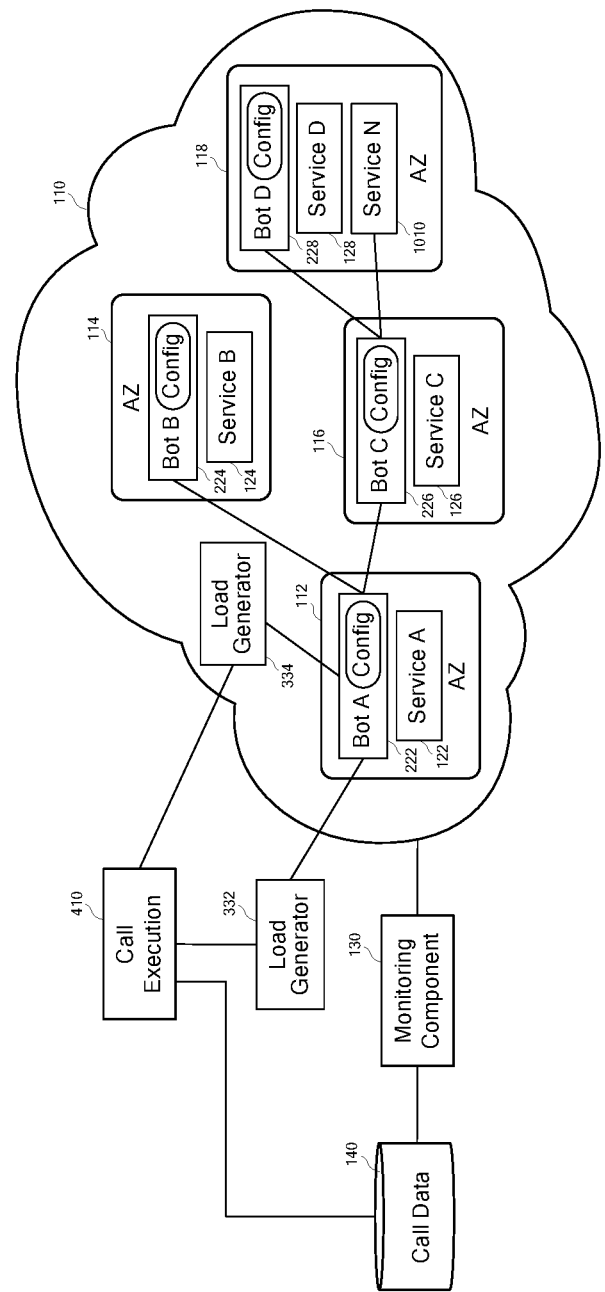
FIG. 10 is a block diagram illustrating deployment and configuration of service-specific bots to simulate service calls within a system landscape including an added service according to some embodiments.
Figure 11:
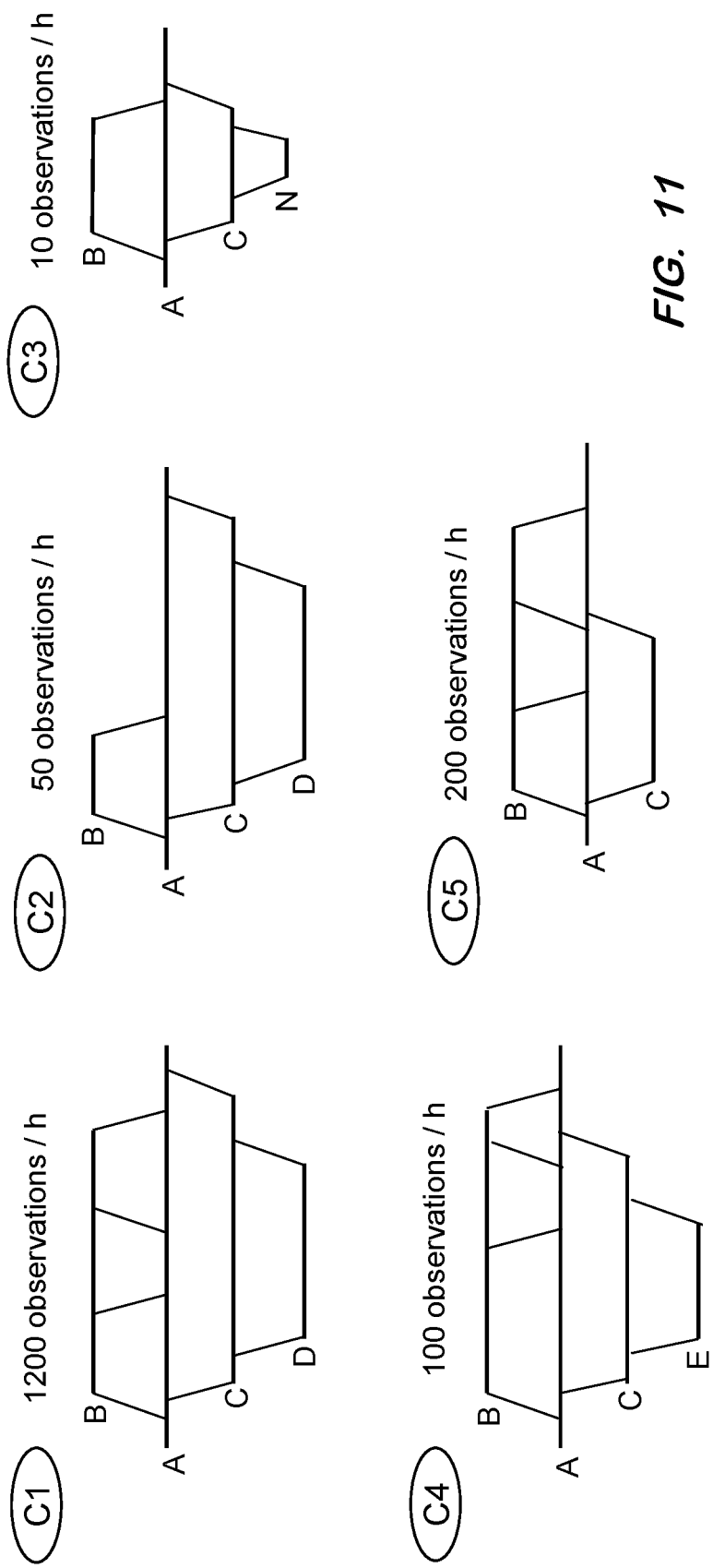
FIG. 11 illustrates call map clusters associated with the FIG. 10 system landscape according to some embodiments.

FIG. 10 illustrates deployment of new Service N 1010 according to some embodiments. Service N 1010 may comprise any service that is or becomes known. As shown, Bot C 226 communicates with Service N 1010. For example, a developer has determined, as shown in FIG. 11, that cluster id C3 is associated with an external call which requires Service C to call Service N and to receive a call from Service N. Accordingly, the configuration of Bot C 226 is modified to account for calls to and from Service N.

FIG. 12 shows configuration information for Bot C 226 according to some embodiments. In comparison to the configuration information of FIG. 9, the information associated with cluster id C3 now indicates that Service N is to be called 20 ms after receiving a call from Bot A, and that Bot A is to be called 20 ms after receiving a call from Service N. As also shown, the call to Service N comprises a pre-configured test call to Service N (and not to a corresponding bot) having a pre-configured size representing a typical call to Service N. The call may include a test flag and Service N is assumed to include a test mode, triggered in response to the flag, in which typical processing occurs in response to the call but no data is committed to productive systems (rather, for example, any resulting database operations are rolled back). The actual response from Service N may then be used in the subsequent call to Bot A.

External calls are then executed and the call data are collected as described above. The call data may be used to evaluate performance of the service mesh in view of the addition of Service N.

The foregoing embodiments assume control of bot deployment and of end-to-end monitoring of calls between services, between bots, and between bots and services within a system landscape. This assumption does not hold true in the case of $3^{rd}$-party services which may be called during operation of the service mesh. Such a $3^{rd}$-party service cannot be replaced by a configured bot in the manner described above.

Figure 13:
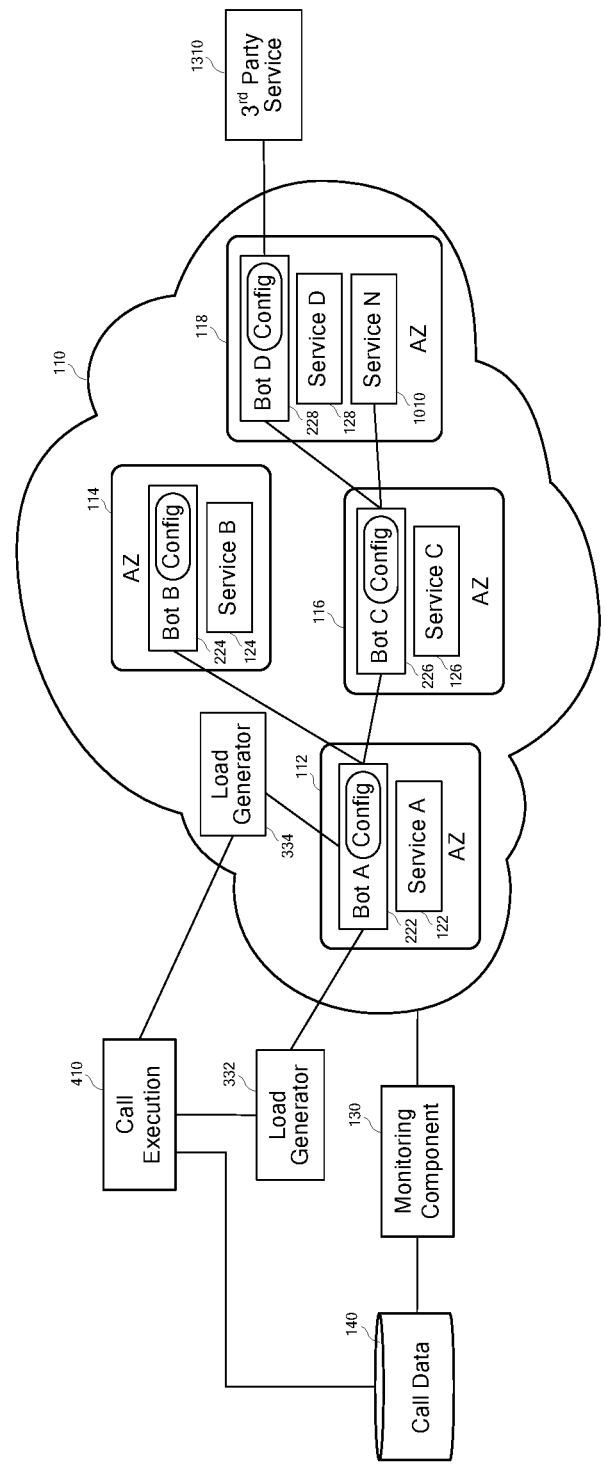
FIG. 13 is a block diagram illustrating deployment and configuration of service-specific bots to simulate modeled service calls in a system landscape including a third-party service according to some embodiments.

FIG. 13 illustrates $3^{rd}$-party service 1310 incorporated into the bot mesh according to some embodiments. In the example, $3^{rd}$-party service 1310 is called by Bot D 228. Bot D 228 may be configured to call a test URL of service 1310 (which is processed as a ping) as well the actual URL used by Service D 128 to call service 1310 during productive operation. The runtime required to process the call to service 1310 may be determined by subtracting the time required to receive a response from a call to the test URL from the time required to receive a response from a call to the actual URL. Bot D 228 is then configured to wait for the determined runtime after receiving a response from the test URL before sending a next service call, so as to simulate the processing time of the $3^{rd}$ party service.

It cannot be assumed that the $3^{rd}$-party service will support inclusion of a task identifier into the service call returned therefrom. Accordingly, for synchronous calls to the $3^{rd}$-party service, a sidecar associated with Bot D 228 is configured to identify the returned call via unblocking of the synchronous call and to add the task identifier to the returned call so that the returned call and subsequent calls can be monitored and evaluated based on task identifiers as described above.

For asynchronous calls, the sidecar stores the task identifier and adds a reference to the task identifier in the call to the $3^{rd}$ party service as a correlation id. Therefore, after receiving the response from the $3^{rd}$-party service, the sidecar maps the correlation id to the task identifier so that the monitoring component can determine that the returned call is associated with the task identifier.

Figure 14:
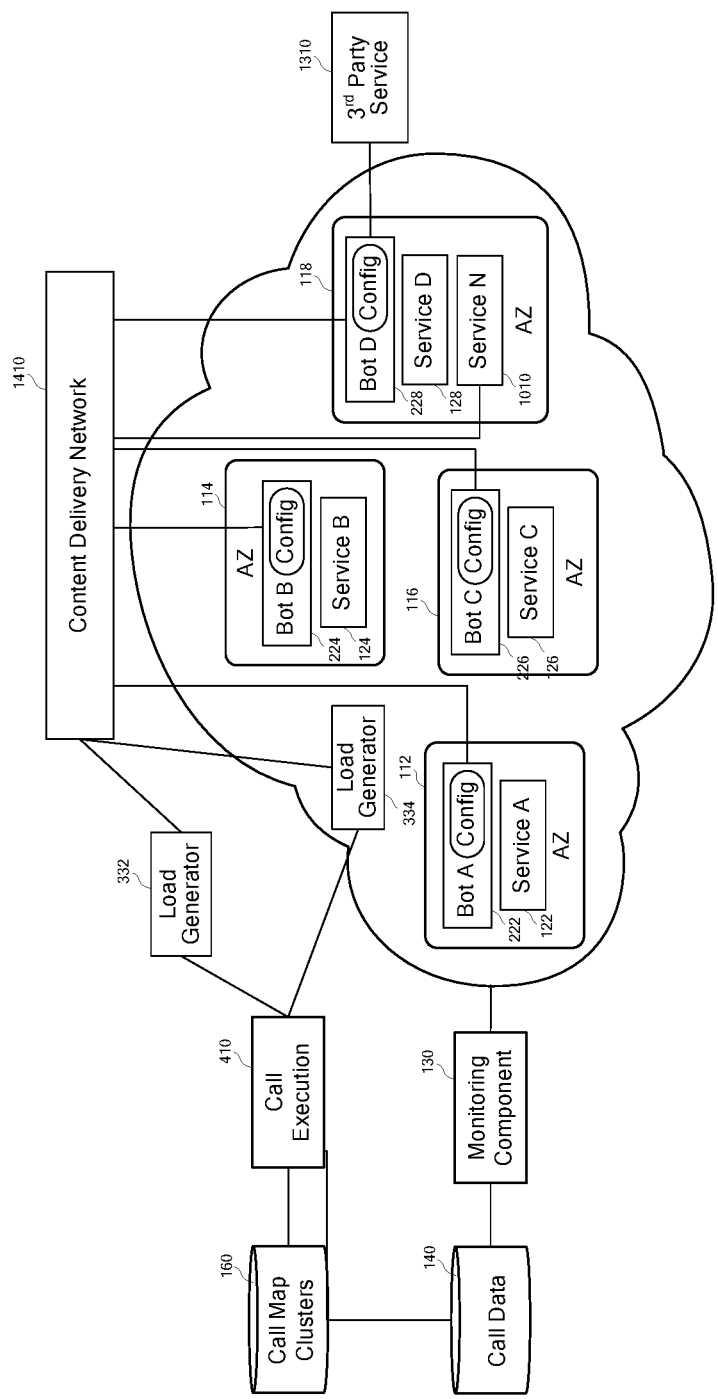
FIG. 14 is a block diagram illustrating deployment and configuration of service-specific bots to simulate service calls within a system landscape including a Content Delivery Network according to some embodiments.

FIG. 14 illustrates addition of CDN 1410 according to some embodiments. The routing provided by a CDN such as CDN 1410 may be complex and difficult to model, and therefore it is conventionally particularly challenging to determine the effects which a CDN would have on a system landscape if added thereto. Embodiments such as that shown in FIG. 14 advantageously allow a developer to evaluate these effects without actually deploying a CDN to communicate with the services of the system landscape.

CDN 1410 may be configured and deployed after deployment of the bots as described above. CDN 1410 is configured as is known to route all service calls during system operation. Performance evaluation may proceed as described above, with load generators 332 and 334 issuing external calls under direction of call execution component 410. These calls are routed to Bot A 222 via CDN 1410 and each bot then operates according to its configuration to issue outgoing service calls based on incoming service calls as described above, albeit via CDN 1410 than directly to another bot. Monitoring component 130 may collect call data including associated task identifiers, and the call data may be grouped by task identifier and analyzed as described above to evaluate overall system performance, cost, etc.

Figure 15:
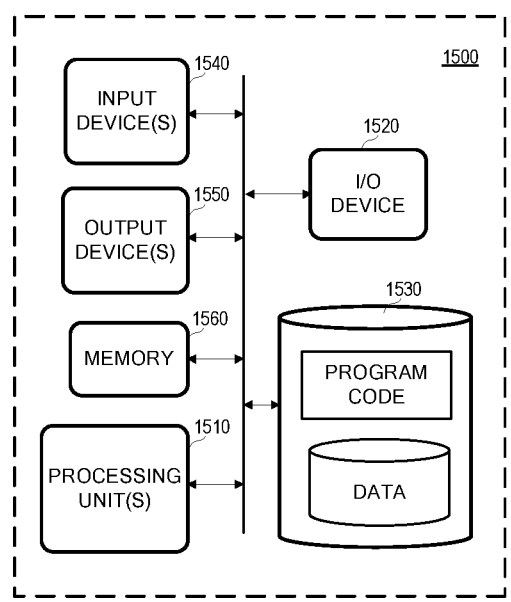
FIG. 15 is a block diagram of a hardware system according to some embodiments.

FIG. 15 is a block diagram of a computing system according to some embodiments. System 1500 may comprise a general-purpose computing apparatus and may execute program code to perform any of the functions described herein, including but not limited to process 500. System 1500 may be implemented by a standalone computing device, a distributed cloud-based server, or other system and may include other unshown elements according to some embodiments.

System 1500 includes processing unit(s) 1510 operatively coupled to an I/O device 1520, data storage device 1530, one or more input devices 1540, one or more output devices 1550 and memory 1560. I/O device 1520 may facilitate communication with external devices, such as an external network, the cloud, or a data storage device. Input device(s) 1540 may comprise, for example, a keyboard, a keypad, a mouse or other pointing device, a microphone, knob or a switch, an infra-red (IR) port, a docking station, and/or a touch screen. Input device(s) 1540 may be used, for example, to enter information into system 1500. Output device(s) 1550 may comprise, for example, a display (e.g., a display screen) a speaker, and/or a printer.

Data storage device 1530 may comprise any appropriate persistent storage device, including combinations of magnetic storage devices (e.g., magnetic tape, hard disk drives and flash memory), optical storage devices, Read Only Memory (ROM) devices, and RAM devices, while memory 1560 may comprise a RAM device.

Data storage device 1530 stores program code executed by processing unit(s) 1510 to cause system 1500 to implement any of the components and execute any one or more of the processes described herein. Embodiments are not limited to execution of these processes by a single computing device. Data storage device 1530 may also store data and other program code for providing additional functionality and/or which are necessary for operation of system 1500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:
1. A method comprising:
   determining a plurality of call map clusters, each call map cluster associated with a respective type of external call and two or more of a plurality of services;

determining, for each service of the two or more of the plurality of services associated with each call map cluster, a configuration specifying characteristics of outgoing service calls issued by the service in response to received service calls, the characteristics comprising payload size and a wait time between reception of a service call by the service and issuance of an outgoing service call by the service to another service in response to the received service call;

deploying a bot proximate to each of the plurality of services; and associating the deployed bot with the respective configuration of each service proximate to the deployed bot, wherein the deployed bot issues outgoing service calls in response to received service calls according to the characteristics specified by the configuration associated with the deployed bot;

issuing a plurality of external calls of each of a plurality of types to the deployed bot;

operating the deployed bot and other deployed bots to issue outgoing service calls based on the configuration associated with the deployed bot and other configurations associated with the other deployed bots, each of the issued outgoing service calls identifying an external call;

monitoring the outgoing service calls;

grouping the monitored outgoing service calls into call maps such that each call map of the call maps comprises a group of outgoing service calls that all correspond to a same type of external call; and generating a second plurality of call map clusters based on the call maps.

2. A method according to claim 1, further comprising:
receiving a first service call at a first deployed bot;
determining, at the first deployed bot, a first type of external call with which the first service call is associated;
determining, at the first deployed bot, a first portion of a first respective configuration associated with the first deployed bot, the first portion of the first respective configuration associated with the first type of external call; and
issuing a first outgoing service call from the first deployed bot to a first target bot based on the first portion of the first respective configuration.

3. A method according to claim 2, further comprising:
receiving a second service call at the first deployed bot;
determining, at the first deployed bot, a second type of external call with which the second service call is associated;
determining, at the first deployed bot, a second portion of the first respective configuration associated with the first deployed bot, the second portion of the first respective configuration associated with the second type of external call; and
issuing a second outgoing service call from the first deployed bot to a second target bot based on the second portion of the first respective configuration.

4. A method according to claim 2, further comprising:
receiving the first outgoing service call at the first target bot;
determining, at the first target bot, that the first outgoing service call is associated with the first type of external call;
determining, at the first target bot, a first portion of a second respective configuration associated with the first target bot, the first portion of the second respective configuration associated with the first type of external call; and
issuing a second outgoing service call from the first target bot to a second target bot based on the first portion of the second respective configuration.

5. A method according to claim 1,
wherein the plurality of external calls are issued by a plurality of load generators respectively deployed in each of a plurality of origination locations,
wherein the external calls are issued by each of the load generators at a frequency based on the location of the load generator and the type of external call, and
wherein each call map cluster is associated with a respective frequency of each type of external call for each of origination locations.

6. A method according to claim 5, further comprising:
deploying a new service; and
changing a configuration associated with each of one or more of the deployed bots to issue outgoing service calls in response to service calls received from the new service or to issue outgoing service calls to the new service in response to received service calls,
wherein the changed configuration includes information specifying a payload size and a wait time for outgoing service calls to the new service.

7. A non-transitory computer-readable medium storing program code executable by a processing unit to cause a computing system to:
determine a plurality of call map clusters, each call map cluster associated with a respective type of external call and two or more of a plurality of services;
determine, for each service of the two or more of the plurality of services associated with each call map cluster, a configuration specifying characteristics of outgoing service calls issued by the service in response to received service calls, the characteristics comprising payload size and a wait time between reception of a service call by the service and issuance of an outgoing service call by the service to another service in response to the received service call;
deploy a bot proximate to each of the plurality of services; and
associate the deployed bot with the respective configuration of each service proximate to the deployed bot,
wherein the deployed bot issues outgoing service calls in response to received service calls according to the characteristics specified by the configuration associated with the deployed bot;
issue a plurality of external calls of each of a plurality of types to the deployed bot;
operate the deployed bot and other deployed bots to issue outgoing service calls based on the configuration associated with the deployed bot and other configurations associated with the other deployed bots, each of the issued outgoing service calls identifying an external call;
monitor the outgoing service calls;
group the monitored outgoing service calls into call maps such that each call map of the call maps comprises a group of outgoing service calls that all correspond to a same type of external call; and
generate a second plurality of call map clusters based on the call maps.

8. A medium according to claim 7, the program code further executable by a processing unit to cause a computing system to:

receive a first service call at a first deployed bot;
determine, at the first deployed bot, a first type of external call with which the first service call is associated;
determine, at the first deployed bot, a first portion of a first respective configuration associated with the first deployed bot, the first portion of the first respective configuration associated with the first type of external call; and
issue a f first outgoing service call from the first deployed bot to a first target bot based on the first portion of the first respective configuration.

9. A medium according to claim 8, the program code further executable by a processing unit to cause a computing system to:
receive a second service call at the first deployed bot;
determine, at the first deployed bot, a second type of external call with which the second service call is associated;
determine, at the first deployed bot, a second portion of the first respective configuration associated with the first deployed bot, the second portion of the first respective configuration associated with the second type of external call; and
issue a second outgoing service call from the first deployed bot to a second target bot based on the second portion of the first respective configuration.

10. A medium according to claim 8, the program code further executable by a processing unit to cause a computing system to:
receive the first outgoing service call at the first target bot;
determine, at the first target bot, that the first outgoing service call is associated with the first type of external call;
determine, at the first target bot, a first portion of a second respective configuration associated with the first target bot, the first portion of the second respective configuration associated with the first type of external call; and
issue a second outgoing service call from the first target bot to a second target bot based on the first portion of the second respective configuration.

11. A medium according to claim 8,
wherein the plurality of external calls are issued by a plurality of load generators respectively deployed in each of a plurality of origination locations,
wherein the external calls are issued by each of the load generators at a frequency based on the location of the load generator and the type of external call, and
wherein each call map cluster is associated with a respective frequency of each type of external call for each of origination locations.

12. A medium according to claim 11, the program code further executable by a processing unit to cause a computing system to:
deploy a new service; and
change a configuration associated with each of one or more of the deployed bots to issue outgoing service calls in response to service calls received from the new service or to issue outgoing service calls to the new service in response to received service calls,
wherein the changed configuration includes information specifying a payload size and a wait time for outgoing service calls to the new service.

13. A system comprising:
one or more processing units; and
a memory storing program code executable by the one or more processing units to cause the system to:

determine a plurality of call map clusters, each call map cluster associated with a respective type of external call and two or more of a plurality of services;
determine, for each service of the two or more of the plurality of services associated with each call map cluster, a configuration specifying characteristics of outgoing service calls issued by the service in response to received service calls, the characteristics comprising payload size and a wait time between reception of a service call by the service and issuance of an outgoing service call by the service to another service in response to the received service call;
deploy a bot proximate to each of the plurality of services; and
associate the deployed bot with the respective configuration of each service proximate to the deployed bot,
wherein the deployed bot issues outgoing service calls in response to received service calls according to the characteristics specified by the configuration associated with the deployed bot;
issue a plurality of external calls of each of a plurality of types to the deployed bot;
operate the deployed bot and other deployed bots to issue outgoing service calls based on the configuration associated with the deployed bot and other configurations associated with the other deployed bots, each of the issued outgoing service calls identifying an external call;
monitor the outgoing service calls;
group the monitored outgoing service calls into call maps such that each call map of the call maps comprises a group of outgoing service calls that all correspond to a same type of external call; and
generate a second plurality of call map clusters based on the call maps.

14. A system according to claim 13, further comprising:
receive a first service call at a first deployed bot;
determine, at the first deployed bot, a first type of external call with which the first service call is associated;
determine, at the first deployed bot, a first portion of a first respective configuration associated with the first deployed bot, the first portion of the first respective configuration associated with the first type of external call; and
issue a f first outgoing service call from the first deployed bot to a first target bot based on the first portion of the first respective configuration.

15. A system according to claim 14, further comprising:
receive a second service call at the first deployed bot;
determine, at the first deployed bot, a second type of external call with which the second service call is associated;
determine, at the first deployed bot, a second portion of the first respective configuration associated with the first deployed bot, the second portion of the first respective configuration associated with the second type of external call; and
issue a second outgoing service call from the first deployed bot to a second target bot based on the second portion of the first respective configuration.

16. A system according to claim 14, further comprising:
receive the first outgoing service call at the first target bot;
determine, at the first target bot, that the first outgoing service call is associated with the first type of external call;
determine, at the first target bot, a first portion of a second respective configuration associated with the first target bot, the first portion of the second respective configuration associated with the first type of external call; and issue a second outgoing service call from the first target bot to a second target bot based on the first portion of the second respective configuration.

17. A system according to claim 15, wherein the plurality of external calls are issued by a plurality of load generators respectively deployed in each of a plurality of origination locations, wherein the external calls are issued by each of the load generators at a frequency based on the location of the load generator and the type of external call, and wherein each call map cluster is associated with a respective frequency of each type of external call for each of origination locations.

* * * * *